United States Patent

[11] 3,574,382

| | | |
|---|---|---|
| [72] | Inventor | Hans Ulrich Strauss<br>Zollikerberg, Switzerland |
| [21] | Appl. No. | 847,028 |
| [22] | Filed | Aug. 4, 1969 |
| [45] | Patented | Apr. 13, 1971 |
| [73] | Assignee | Swiss Aluminum Ltd.<br>Chippis, Switzerland |
| [32] | Priority | Aug. 2, 1968 |
| [33] | | Switzerland |
| [31] | | 11623/68 |

[54] DEVICE FOR CONVEYING AND STORING OBJECTS
7 Claims, 7 Drawing Figs.

[52] U.S. Cl. .................................................. 294/67,
214/10.5, 220/97
[51] Int. Cl. ..................................................... B65g 1/14
[50] Field of Search ........................................... 220/97 (B);
214/10.5; 294/67.4, 67.4 (A), 67

[56] References Cited
UNITED STATES PATENTS

| | | | |
|---|---|---|---|
| 3,157,424 | 11/1964 | Hall............................. | 294/67(.4A) |
| 3,173,556 | 3/1965 | Gaudriot et al............... | 294/67(.4A)X |

*Primary Examiner*—Gerald M. Forlenza
*Assistant Examiner*—Frank E. Werner
*Attorney*—Ernest F. Marmorek ABSTRACT: A device for conveying and storing objects in guide carrying vessel means, such as containers or plate supports, has two U-shaped carriers that are spaced apart from each other and support the vessel means and have inner guide means engaging the vessel guides, have at the free ends of the legs of the carriers upper support surfaces, for carrier stacking, and have engaging means adapted to be engaged by a lifting device for conveyance, and have near the base of the leg portions recesses that correspond substantially in shape to that of the engaging means for the lifting devices so that during stacking the engaging means of the lower carriers will fit into the recesses of the carriers immediately above.

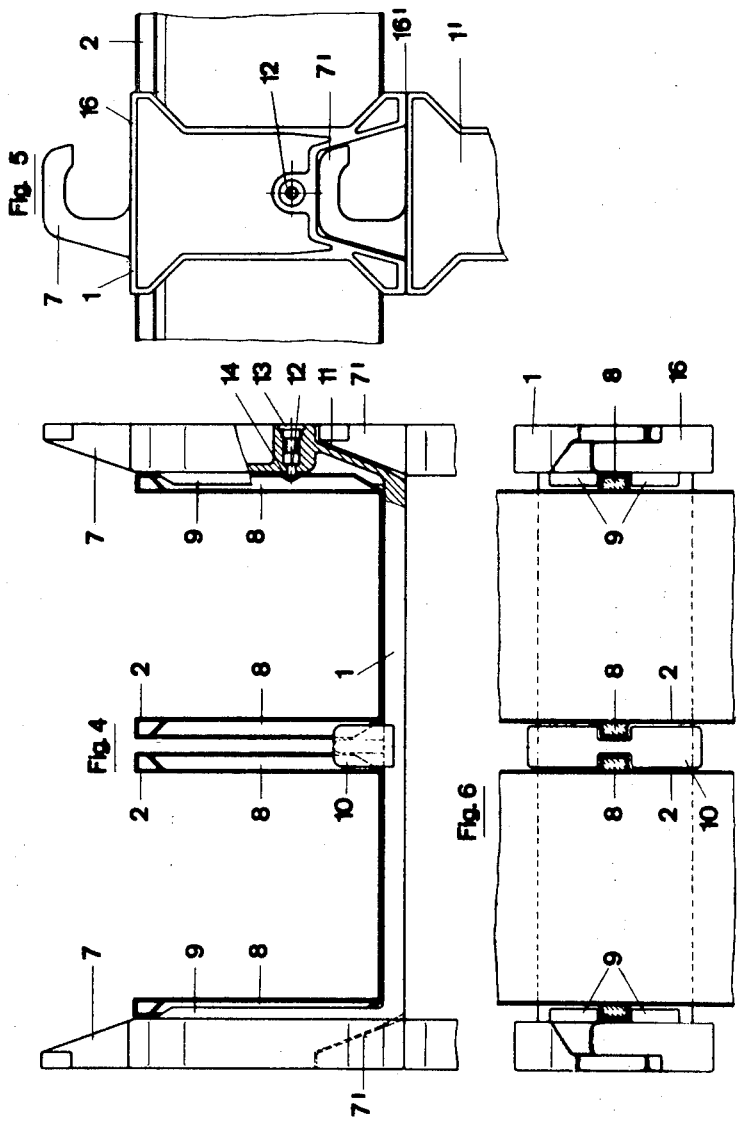

DEVICE FOR CONVEYING AND STORING OBJECTS

The invention relates to a device for the transport and the storage of objects of all kinds, in vessel means, such as containers or plate supports.

Heretofore, containers have been used for that purpose that had fittings that rendered it possible to engage the container by means of lifting devices, such as loading beams, crane cables or the like. These containers of the prior art furthermore permitted stacking. The protruding metal fittings, however, had the disadvantage that they made the containers more expensive, and increased the space required for storing these containers, thus again adding to the financial burden involved by the use of these containers of the prior art.

It is accordingly among the principal objects of the invention to avoid these and other drawbacks of the prior art.

It is another object of the invention to provide a simple device for conveying and storing objects that permits stacking as well as lifting.

It is a further object of the invention to provide for such a device that is versatile in conveying and storing objects and yet can be manufactured and used at comparably low cost.

Further objects and advantages of the invention will be set forth in part in the following specification and in part will be obvious therefrom without being specifically referred to, the same being realized and attained as pointed out in the claims hereof.

Broadly speaking, these aims are obtained in accordance with the invention by the provision of two U-shaped carriers that are spaced apart for a distance and engage a vessel means, such as one or more containers or one or more plate supports or the like; and the provision of guiding between the vessel means and the carriers; furthermore, the carriers are stackable by the provision of upper support surfaces being defined on the free ends of the upright legs of the carriers, and have engaging means to be engaged by a lifting device for conveyance; lastly, the legs of the U-carriers have near their bases recesses to receive the engaging means of the lower carriers, during stacking.

Containers of widely varying shape can be used in connection with the instant invention, such as containers with four, or only two, adjoining sidewalls; or containers which have a lattice sidewall. Plate supports may likewise be used that include upright rods alongside the vertical sides of the plate, and bars interconnect the upper sections of these upright rods. Even a simple plate may be used for supporting objects, for instance elongated objects.

The guide arrangements between the vessel means, such as the containers and/or plate supports on one hand and the carriers on the other, for promoting positive insertion and mutual fitting, may be formed on the outer walls of the containers or at the bottom of the plates.

The containers and/or plate supports may be used in superposed position in the carriers, and the carriers of superposed or other containers may, in turn, be stacked and stored in this manner. The containers of the instant invention may be made of lighter weight as compared to the containers of the prior art with the aforesaid metal fittings. For long-time storing, the U-shaped carriers may be removed, for the saving of storage space.

Mutual guiding arrangement between the U-shaped carriers and the vessel means render possible the accurate and predetermined mutual relative positioning thereof, with the carriers thus being spaced apart for a predetermined distance, thereby facilitating the engagement of the carriers by the cables of cranes, or by load bars. These guide arrangements can be augmented by the provision of a locking device between each carrier and the vessel means, for improved fixation of the mutual position, thereby facilitating the conveyance by crane.

For a fuller understanding of the nature and objects of the invention, reference should be had to the following detailed description, taken in connection with the accompanying drawings, in which:

FIG. 4 is a large scale end elevational view, partly in section, of a still further modified device, wherein two channel-shaped containers are engaged side by side in U-shaped carriers, and locked in that position;

FIG. 5 is a fragmentary elevational view of the modification shown in FIG. 4;

FIG. 6 is a fragmentary plan view thereof; and

In carrying the invention into effect in the embodiments which have been selected for illustration in the accompanying drawings and for description in this specification, devices are shown which are designed for conveying elongated objects, such as rods, tubes, extruded shapes, and the like.

Figure 1:
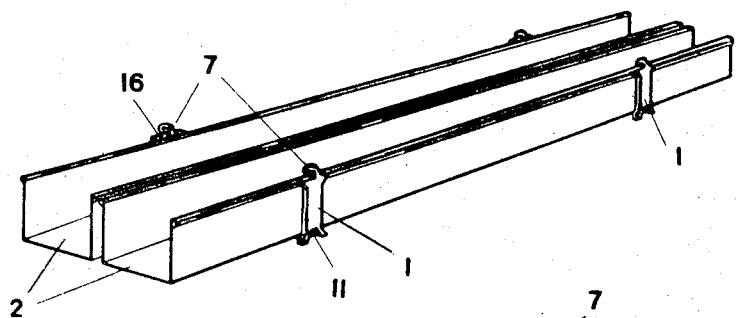
FIG. 1 is a perspective view of a device in accordance with an embodiment of the invention.

As best shown in FIG. 1, two elongated channel-shaped containers 2 are engaged side by side in U-shaped carriers 1. The carriers 1 are spaced apart from each other for a predetermined distance, and the channel-shaped containers 2 extend therebetween and beyond both carriers 1. The channel-shaped containers 2 may be made in simple well-known conventional manner from sheet metal.

Figure 3:
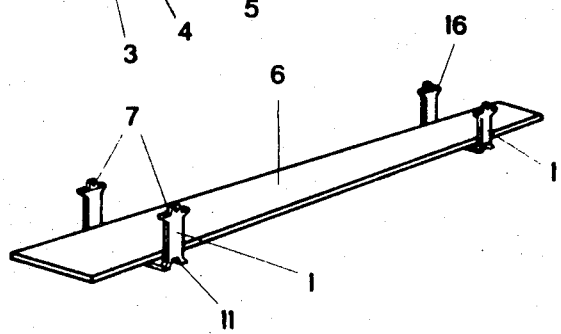
FIG. 3 is a perspective view, similar to FIG. 1, but showing a still further modification of the device.

In FIG. 3, a plate 6 extends between the carriers 1. A guide arrangement is provided between the carrier 1 and the plate 6, and includes guides formed on the underside of the plate 6, and corresponding guide means formed on the upper surface of the web of the U-shaped carriers 1, but these are not shown in FIG. 3.

Figure 2:
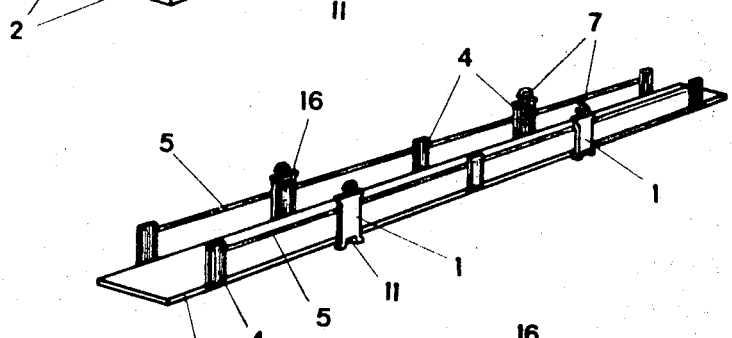
FIG. 2 is a perspective view, similar to FIG. 1, but showing a modified device.

The carriers 1 include engaging means 7 to be engaged by lifting means, such as cranes. They may be formed as hooks (as shown in FIG. 1), or as double hooks (as shown in FIG. 2), or in the form of holes (as shown in FIG. 3).

Adjacent the engaging means 7, the free ends of the legs of the carriers 1 furthermore have upper support surfaces 16 (FIGS. 1—3 and 5) that serve for the stacking of the carriers 1. Near the base of the free legs, there are provided recesses 11, which serve to receive during stacking the engaging means 7 of the carriers immediately below.

As best shown in FIGS. 1 and 4—6, guide arrangements are provided between the sidewalls of the container 2 and the inner surfaces of the carriers 1. They include shaped rods 8 formed on the container 2, and guide means 9 that define grooves arranged to receive the rods 8.

Where it is desired, as in FIGS. 1 and 4—6, that two containers 2 are to be placed side by side in the carriers 1, there is provided near the center of the web of the U-carrier 1, a guide piece 10 for the corresponding shaped rods 8.

In FIG. 4 and 5 there is best shown the resting of the engaging means 7' of the lower carrier 1' into the recess 11 of the upper carrier 1.

Locking means may be provided, as best shown in FIGS. 4 and 5, between each carrier 1 and the container or containers 2 thereof. These locking means include a locking device that comprises a bolt 12 that is biased by a spring and is connected to a screw 13 that is threaded into the leg of a carrier 1. The bolt 12 rests in a depression 14 that is formed in the shaped rod 8 of the container 2.

Figure 7:
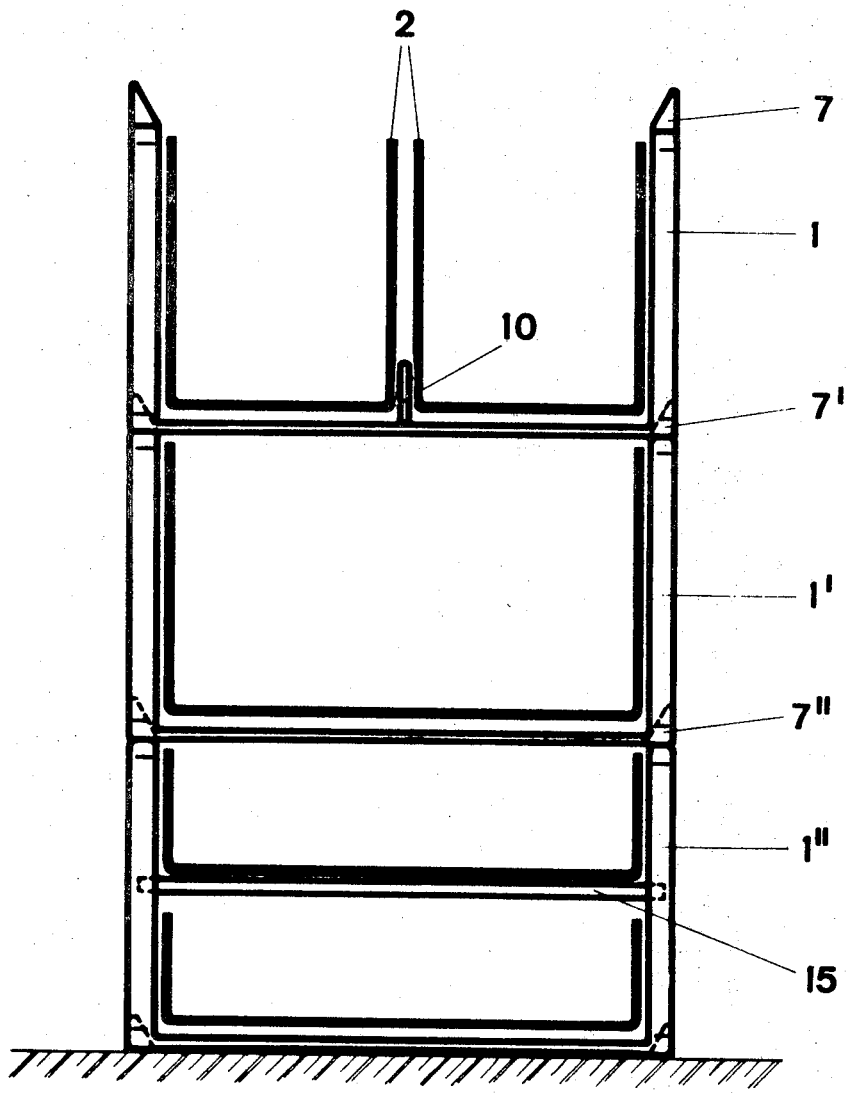
FIG. 7 is an end elevational view of another modification.

In FIG. 7 there is shown the superposing of containers in a pair of carriers, and then stacking of container carrying carriers. Three carriers are shown stacked in superposition, the lowermost being designated 1'', the central identified as 1', and the top carrier designated 1. The carriers 1'' have their legs bridged by a bar 15 that extends about half way of the height of the legs and is supported by the legs. The bar 15 supports a second container above the lower container.

The middle carriers 1' have a single container; while the top carriers mount two containers 2 side by side.

I wish it to be understood that I do not desire to be limited to the exact details of construction shown and described, for obvious modifications will occur to a person skilled in the art.

I claim:

1. A device, for use in conveying and storing objects in guide carrying vessel means such as containers or plate supports, comprising in combination:

two U-shaped carriers spaced apart from each other, in which one or more offset containers or offset plate supports are adapted to be fitted;

said carriers including:

inner guide means adapted to engage said vessel guides for the mutual relative positioning of the carriers and the vessel means;

the free ends of the legs of said carriers defining upper support surfaces, for carrier stacking, and including:

engaging means adapted to be engaged by a lifting device, for conveyance; and having near the base of said leg portions recesses substantially corresponding in shape to that of said engaging means so that during stacking the engaging means of the lower carriers will fit into the recesses of the carriers immediately above.

2. A device, as claimed in claim 1, said vessel means comprising at least one channel-shaped container made of sheet metal, said guides including rods welded to said vessel means at the sides thereof engaging said guide means.

3. A device, as claimed in claim 1, said plate supports including shelves fittable into said carriers, and comprising along their elongated sides vertical rods, and bars interconnecting the upper ends of said rods.

4. A device, as claimed in claim 1, said vessel means including a shelf fittable into said carriers.

5. A device, as claimed in claim 1, and locking means between each carrier and the vessel means thereof, whereby the relative position between the carriers and vessel means will be retained.

6. A device, as claimed in claim 1, and a bar extending between the legs of a carrier below the free ends thereof, permitting the vertical division of the space defined by said carriers, for the fitting of two superposed containers or plate supports in said carriers.

7. A device, as claimed in claim 1, the web of each carrier extending between said legs including an additional guide piece for the guided positioning side by side of two containers or plate supports in said carriers.